United States Patent Office.

WALTER P. LINCOLN AND MORRIS S. GREENBAUM, OF LOUISVILLE, KENTUCKY.

PROCESS OF REDUCING AND DEODORIZING RESIDUES.

SPECIFICATION forming part of Letters Patent No. 688,102, dated December 3, 1901.

Application filed September 10, 1900. Serial No. 29,619. (No specimens.)

*To all whom it may concern:*

Be it known that we, WALTER P. LINCOLN and MORRIS S. GREENBAUM, citizens of the United States, residing at Louisville, in the county of Jefferson and State of Kentucky, have invented certain new and useful Improvements in Processes of Reducing and Deodorizing the Residuum from the Manufacture of Certain Named Substances; and we do hereby declare that the following is a clear, full, and exact description of the invention, which will enable others skilled in the art to which it pertains to use the same.

Experience has demonstrated that the residuum or refuse from the manufacture of spirituous and malt liquors, starch, sugar, and glucose, consisting of water in combination with certain solid particles, are valuable and when separated and dried constitute a superior food for stock. Various methods and processes have been adopted to separate and conserve the solid matters therein contained, all of which are more or less successful in separating and conserving the larger particles of matter, but none of which have succeeded in saving the more minute particles in combination, which are lost or destroyed in the various processes now in use. When they are permitted to pass away in the liquid remaining after the completion of the process, they finally decompose and produce offensive odors. These minute particles of matter constitute the more valuable part of the solids in combination in all such residuum; and the object of our invention is to separate and conserve them in addition to and in connection with the larger particles, thereby increasing the quantity and improving the quality of the food product and also sterilizing, deodorizing, and disinfecting the resulting liquor, so as to destroy all offensive odor. The method of accomplishing these results may be varied considerably without impairing our process as a whole, and we do not bind ourselves to any particular one; but in practice we find the following to be effective.

The residuum as it is discharged is screened, reeled, or settled, so as to separate the larger solids, and the thin liquid is then drawn off into settling-tanks, of iron or other suitable material. The screenings are then subjected to pressure in a filter, hydraulic, or other suitable press, and the liquid resulting from this pressure is added to that in the settling-tanks. Then chlorid of sodium or other suitable salt is added to the liquid in the settling-tanks, and this liquid is subjected to a current of electricity applied by any of the ordinary methods, the object and effect of which is to hasten and increase the depositing of the remaining solids and also to sweeten and sterilize the liquid, so as to remove and prevent all offensive odors therefrom, and it is then permitted to settle. After settling for a sufficient time the liquid is drawn off and discharged, and the solids deposited in the tanks are combined with the screenings and the whole subjected to pressure and heat or to pressure or heat in any of the usual methods to remove the remaining moisture to dryness, and the product is then ready for market.

In applying the current of electricity we have used wooden tanks to hold the liquid, the poles of the battery being composed of iron, preferably boiler-iron. We have also used the same character of tank with the poles of the battery, composed of copper (anode and cathode) plated with platinum. We have also used iron tanks, the tank itself forming the cathode of the battery, with the anode, also composed of iron, suspended in the center thereof. Either of these methods of applying the current produce satisfactory results with or without the addition of the salt. In practice, however, we find it preferable to use the salt, as its addition intensifies the action of the current and combines with the acetic acid which the residuum contains. Chlorid of sodium is the salt it is preferable to use because the action of the current of electricity thereon produces free chlorin, which sweetens and sterilizes the liquid, so as to remove and prevent all offensive odors therefrom, and increases and hastens the deposition of the solids in the liquid.

In all methods of treating residuum of this character to separate and conserve the solids in combination heretofore used the separation and conservation has not been complete and the water remaining is sour and gives off disagreeable and offensive odors. In our process, by the use of a current of electricity and chlorid of sodium or other suitable salt, the finer and more minute particles in combination are separated, deposited, and saved, thereby increasing the quantity and improving the quality of the food product, and the water discharged is sweet, innocuous, and without disagreeable odor or smell. In the processes heretofore used for this purpose screens, reels, settling-tanks, pressure, and heat have been used, either singly or in various combinations, or both. The use of the current of electricity and the addition of chlorid of sodium or other suitable salt is new, and we desire it distinctly understood that the use of the current of electricity in combination with the other parts of the process may be used successfully without the addition of chlorid of sodium or any other salt.

Having fully described our invention, what we claim, and desire to secure by Letters Patent, is—

1. The process of treating the residuum from the manufacture of spirituous and malt liquors, sugar, starch, and glucose, which consists in reducing to a deposit the solid particles held in suspension in said residuum by subjecting said residuum to the application of a current of electricity, substantially as described.

2. The process of treating the residuum from the manufacture of spirituous and malt liquors, sugar, and glucose, for the purpose of separating the solids therefrom, which consists in adding a salt and then subjecting the same to a current of electricity, substantially as described.

3. The process of treating the residuum from the manufacture of spirituous and malt liquors, starch, sugar and glucose, for the purpose of separating the solids therefrom, which consists in adding chlorid of sodium and subjecting the same to the application of a current of electricity, substantially as described.

4. The process of treating the residuum from the manufacture of spirituous and malt liquors, starch, sugar and glucose, which consists in separating the larger particles of solid matter, and then reducing to a deposit the solid particles held in suspension in the remaining residuum, by subjecting the same to the application of a current of electricity, substantially as described.

5. The process of treating the residuum from the manufacture of spirituous and malt liquors, starch, sugar and glucose, which consists of physically separating from the residuum the larger particles of solid matter, then adding to the remaining residuum a salt and then subjecting the said remaining residuum to the application of a current of electricity, substantially as described.

6. The process of treating the residuum from the manufacture of spirituous and malt liquors, starch, sugar and glucose, which consists of physically separating from the residuum the larger particles of solid matter, then adding to the remaining residuum, chlorid of sodium and then subjecting the said remaining residuum to the application of a current of electricity, substantially as described.

7. The process of separating and conserving solids contained in the residuum of spirituous and malt liquors, starch, sugar, and glucose, which consists in reducing the solid matter in the residuum to a deposit by electrolysis and then separating the deposited solids from the liquid, and reducing said solids to a dried state, substantially as described.

8. The process of treating the residuum from the manufacture of spirituous and malt liquors, starch, sugar and glucose, for the purpose of separating and conserving the solids therein contained for stock-food, which consists in separating the larger particles of solids from the residuum, drawing off the thin portion in tanks, subjecting separated solids to pressure, then adding the expressed liquid to that in the tanks, subjecting the liquid in the tanks to a current of electricity, substantially as described.

9. The process of treating the residuum from the manufacture of spirituous and malt liquors, starch, sugar and glucose, for the purpose of separating and conserving the solids therein contained, for stock-food, which consists in separating from the residuum, the larger particles of solid matter, then drawing off the thin portion in settling-tanks, subjecting the separated solids to pressure, adding the expressed liquid to that in the tanks, subjecting the liquid in the tanks to the action of electrolysis, then drawing off the water from the deposited solids, mixing the same deposit with the previously-separated solids and reducing the whole to a dried state, substantially as described.

10. The process of treating the residuum from the manufacture of spirituous and malt liquors, starch, sugar and glucose, for the purpose of separating and conserving the solids contained therein for stock-food, which consists of separating the larger particles of solids from the residuum, drawing off the thin portion into settling-tanks, subjecting the separated solids to pressure and adding the expressed liquid to that in the settling-tanks, adding thereto chlorid of sodium and subjecting the liquid in the tanks to a current of electricity, drawing off the water from the deposited solids, mixing the deposit in the tanks with the previously-separated solids, and reducing the whole to a dried condition, substantially as described.

WALTER P. LINCOLN.
MORRIS S. GREENBAUM.

Witnesses:
CHAS. CONRAD,
D. J. LINCOLN.